May 4, 1937.                 C. F. FAGERBURG              2,079,203
                             WINDSHIELD DEFROSTER
                             Filed Feb. 28, 1936

Inventor
Carl F. Fagerburg
By:
Fisher, Clapp, Soans, Pond  Attys:

Patented May 4, 1937

2,079,203

UNITED STATES PATENT OFFICE 2,079,203

WINDSHIELD DEFROSTER

Carl F. Fagerburg, Chicago, Ill.

Application February 28, 1936, Serial No. 66,196

3 Claims. (Cl. 98—2)

My invention relates to devices for automatically defrosting the windshields of automobiles or other vehicles, and the principal objects of the invention are: to provide a defroster of this type which shall utilize a draft or blast of air induced by the motion of the vehicle for accomplishing the defrosting action; and to provide a defroster which shall be simple in design, which shall utilize no moving parts whatsoever, and which shall be inexpensive to manufacture and convenient to install and use.

Other objects and advantages of my invention will be understood by reference to the following specification and the accompanying drawing wherein is illustrated a preferred embodiment thereof.

In the drawing—

Figure 1:
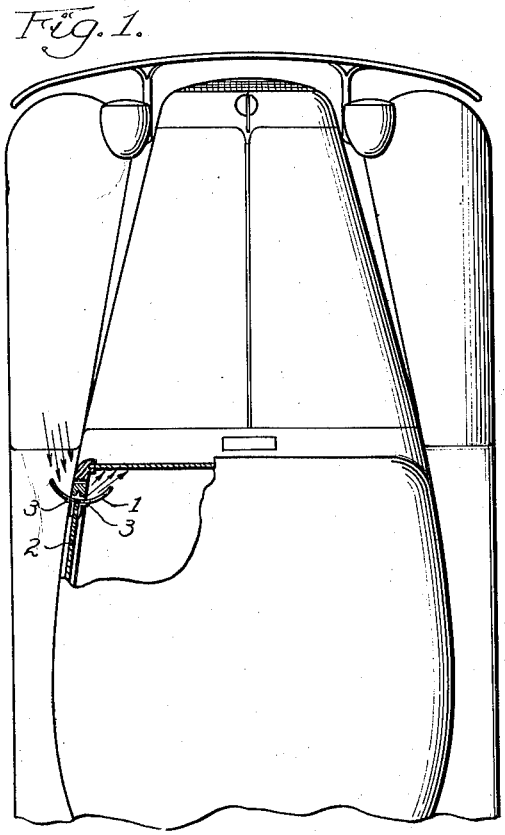
Fig. 1 is a schematic view showing a defroster in accordance with my invention as applied to an automobile.
Figure 2:
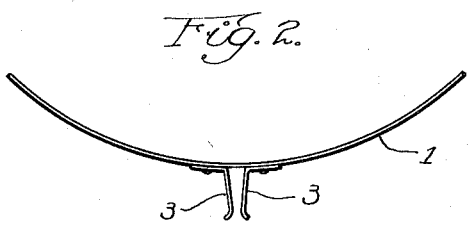
Fig. 2 is an enlarged plan view of the defroster illustrated generally in Fig. 1.
Figure 3:
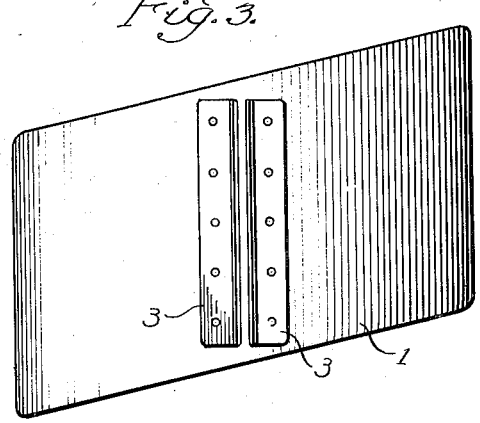
Fig. 3 is a rear elevation of the defroster shown in Figs. 1 and 2.
Figure 4:
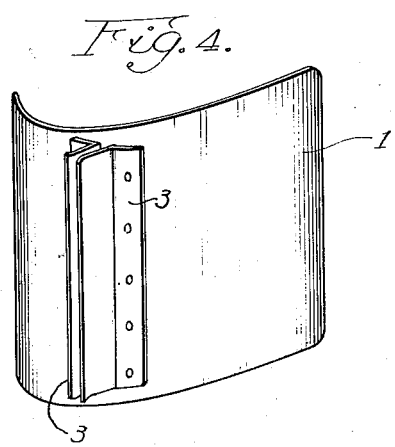
Fig. 4 is a perspective view of the defroster.

In the form of my invention illustrated in the drawing, the defroster consists of a suitable deflector member 1 and means for mounting that member in an operative position upon the vehicle with which it is used, as is shown particularly in Fig. 1. The deflector member is so arranged that forward movement of the vehicle produces a blast or current of air which is directed upon the inside surface of the windshield of the vehicle.

Preferably the deflector member 1 comprises an oblong shaped piece of relatively thin, flat, sheet material, which may be of aluminum or brass or other metal, and which is curved longitudinally so as to define a substantially cylindrical surface. The longitudinal axis of the deflector member is inclined at a substantial angle to the transverse axis of that member in order that the air currents produced by the deflector shall be directed upwardly across the windshield. Expressed somewhat differently, the deflector member comprises, in effect, a section of a ribbon helix.

The means for supporting the deflector in an operative position on the vehicle with which it is used may comprise a pair of opposed angle members 3, at least one of which is preferably formed of spring material, and both of which are riveted or otherwise securely affixed to the central portion of the convex side of the deflector member proper.

The specific form of my invention which I have illustrated in the drawing is particularly intended for use with automobiles wherein the side windows may be opened by moving the side window glass rearwardly. This manner of operation of the side windows is exemplified in the current closed models of the Ford and Plymouth automobiles. The angle members 3 which define, in effect, a spring clamp, are adapted to engage the forward vertical edge of one of the side window glasses (indicated at 2 in Fig. 1), and are arranged parallel to the transverse axis of the deflector in order that the deflector when in use shall be inclined from the horizontal, thereby deflecting the current of air produced during the operation of the defroster upwardly. This upward inclination of the deflector is of great value in securing proper directing of the air current when the deflector is used in conjunction with a window glass having a rearwardly sloping front edge, as is common in many vehicles of the type to which the present invention particularly relates. The general direction of the air currents is indicated by the arrows in Fig. 1. Other methods of mounting are of course within the province of my invention.

The amount of air introduced into the vehicle by the deflector may be easily controlled by moving the window glass forwardly or rearwardly. Thus, during use of the defroster, the amount of cold air introduced into the vehicle by the defroster can be reduced to the minimum possible amount necessary to accomplish the defrosting of the windshield.

From the foregoing, it will be seen that I have provided a novel form of defroster particularly suitable for use with certain of the more popular types of automobiles. The defroster of my invention is extremely simple in design; it utilizes no moving parts whatsoever; it is entirely automatic in its operation; and it may be manufactured at a very low cost. Further, the device is convenient to install, and the magnitude of the current or blast of air which accomplishes the defrosting action may conveniently be adjusted by movement of the window glass upon which the defroster is preferably supported. In addition, the device may be readily removed when its use is not necessary, and it serves to aid in ventilating the interior of the vehicle in addition to accomplishing the defrosting action.

While in accordance with the patent statutes, I have illustrated a specific form of my invention, it will be understood that various modifications thereof can be readily made, and it is my intention that the accompanying claims shall be construed as broadly as possible consistent with the state of the art.

I claim the following as my invention:

1. In a windshield defroster for use with a vehicle having a windshield and a side window which may be opened by moving the side window glass rearwardly, a deflector which causes a current of air to be created by movement of the vehicle and which directs that current of air onto the windshield, said deflector comprising a unitary, relatively thin-walled, curved member, and means for mounting said deflector upon the front vertical edge of a side window glass of the vehicle with which it is used in order that said deflector may be adjusted by moving the side window glass.

2. A defroster for use with an enclosed vehicle having a windshield and a side window which may be opened by moving the side window glass rearwardly, comprising an oblong member of flat sheet material which is curved so as to define substantially a portion of a ribbon helix, and means for supporting said member upon the forward vertical edge of the side window glass of the vehicle with which said member is used in such manner that the longitudinal axis of said member shall be inclined upwardly in the direction of said windshield.

3. In a windshield defroster for use with a vehicle having a windshield and a side window glass which may be opened by moving the side window glass rearwardly, a deflector which causes a current of air to be created by movement of the vehicle and which directs that current of air onto the inner surface of the windshield, said deflector comprising an oblong member of flat sheet material which is curved so as to define a substantially cylindrical surface, and means for releasably mounting said deflector member upon the front vertical edge of a side window glass of the vehicle with which it is used in such manner that the transverse axis of said member shall extend in a generally vertical direction, and the longitudinal axis of said member shall be inclined upwardly in the direction of said windshield.

CARL F. FAGERBURG.